Aug. 11, 1925.

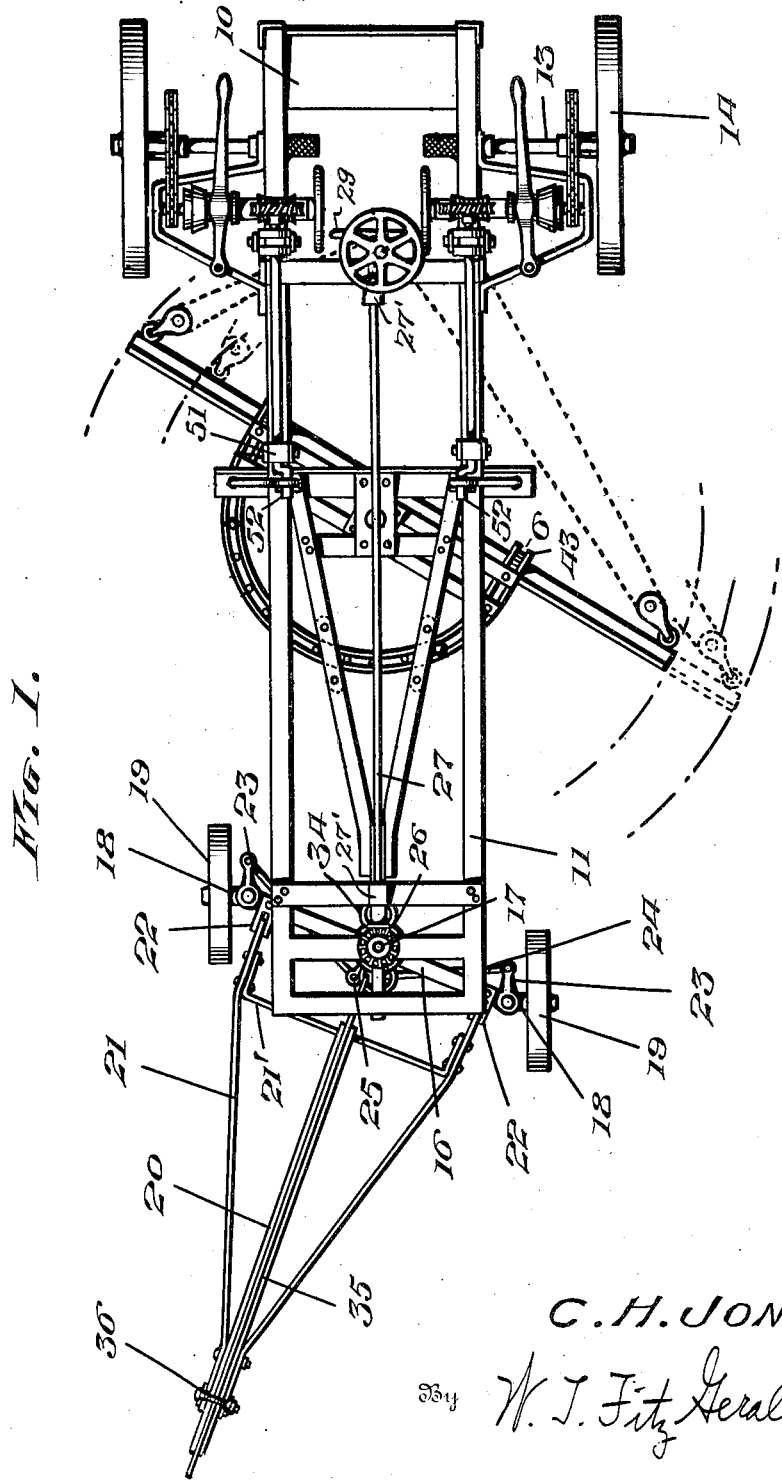

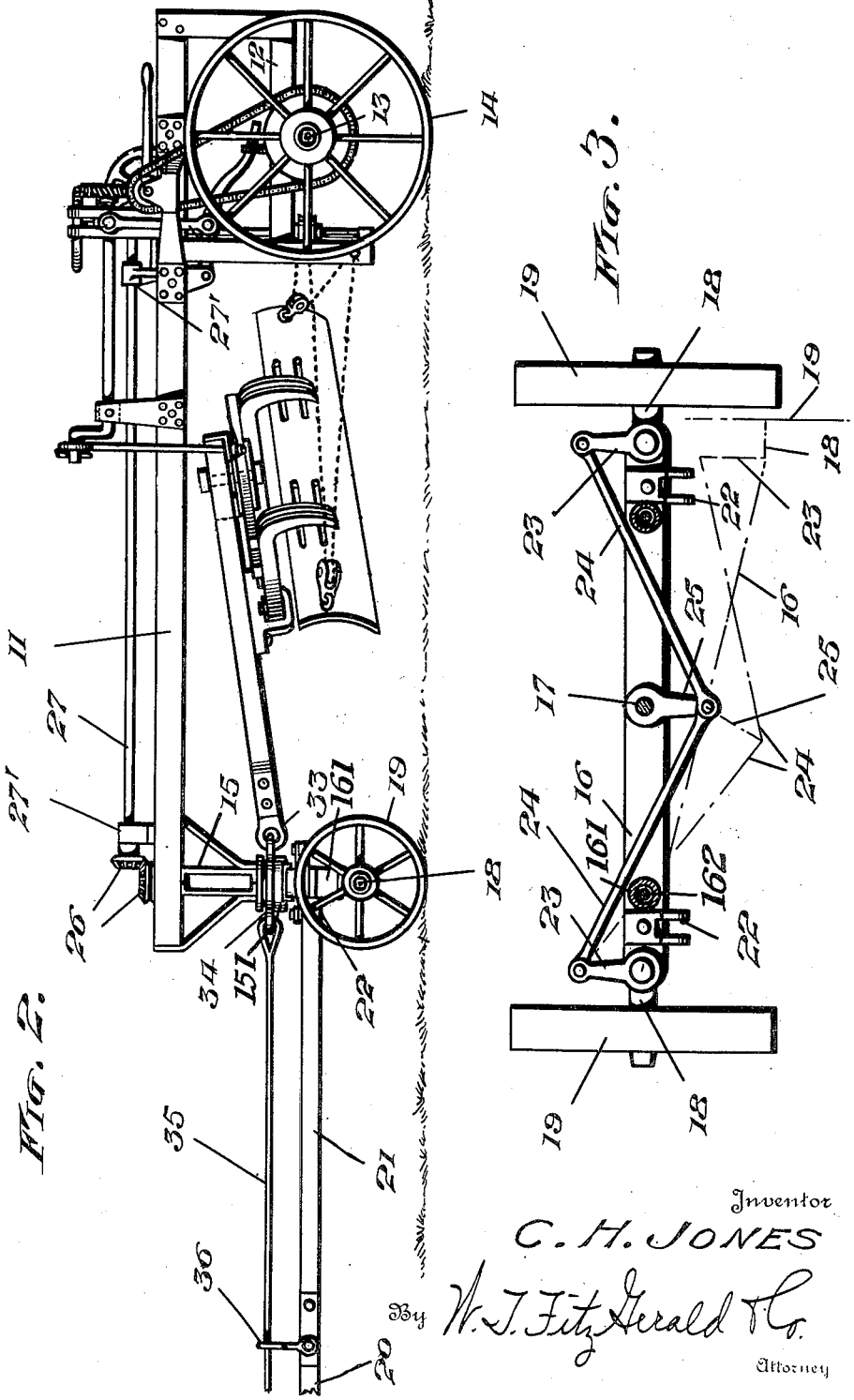

C. H. JONES

STEERING GEAR

Filed Feb. 18, 1921

Inventor
C. H. JONES
By W. J. Fitz Gerald & Co.
Attorney

Patented Aug. 11, 1925.

1,549,086

UNITED STATES PATENT OFFICE.

CHARLES H. JONES, OF GALVA, ILLINOIS.

STEERING GEAR.

Application filed February 18, 1921. Serial No. 446,075.

*To all whom it may concern:*

Be it known that I, CHARLES H. JONES, a citizen of the United States, residing at Galva, in the county of Henry and State of Illinois, have invented certain new and useful Improvements in Steering Gears; and I do hereby declare the following to be a full, clear, and exact description of the invention, such as will enable others skilled in the art to which it appertains to make and use the same.

The present invention relates to grading or scraping machines, such as used for surfacing roads, and aims to provide a machine of that kind improved generally in its construction and details to operate in a practical and efficient manner.

The object of the invention is the provision of a novel and improved combination steering gear controlled from a tractor or other means for pulling the machine, and also under the control of the operator of the machine to keep the machine in the proper or desired line of travel.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated within the accompanying drawings, wherein:—

Figure 1 is a plan view of the improved machine.

Fig. 2 is a side elevation thereof.

Fig. 3 is a horizontal section on the line 3—3 of Fig. 4, showing in dotted line diagram another position of the parts.

Figure 4:
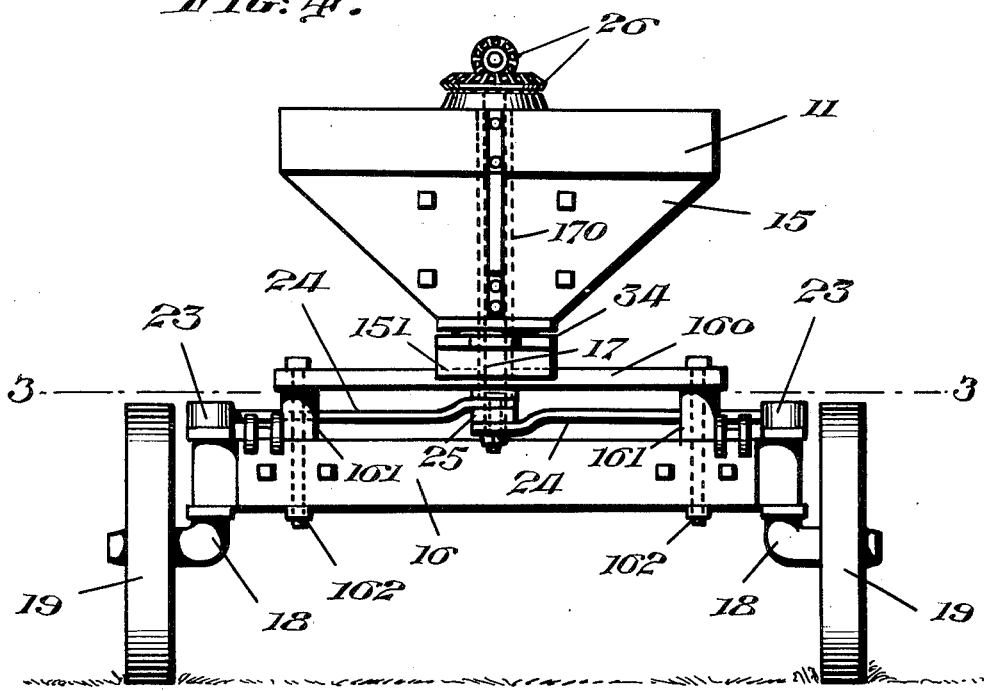
Fig. 4 is a front view of the steering gear.

The machine comprises a suitable main frame 11 having a seat 10 for the operator at its rear end, and having a dropped portion 12 at its rear end mounted on the rear axle 13, which is secured to the frame, and the ground wheels 14 are mounted for independent rotation on the ends of said rear axle 13.

A combination steering gear is provided, and the frame 11 has a transverse supporting bolster 15 underneath its forward end mounted on the front axle 16. This axle is connected by a "fifth wheel" with the frame, in the manner of buggy or wagon axles, and a vertical tube 170 secured to the frame 11 and bolster 15 serves to pivot the axle 16 between its ends to the frame. The lower terminal of the tube 170, which forms the fifth wheel "king pin", is fitted for rotation in a channel iron or bar 160 and a fifth wheel block 151 fitted on said bar. The bar 160 is secured to and supported above the axle 16, by having its end portions seated and fastened on supporting members 161 resting on the axle. The bar 160 and supporting members 161 are clamped on the axle 16 by means of bolts 162 or the like. The axle 16 has the steering knuckles or stub axles 18 hingedly connected to the ends thereof, as in motor vehicles, and front wheels 19 are fitted for rotation on the knuckles 18, whereby said wheels are movable forwardly and rearwardly with the ends of the axle, and are also mounted to turn to different angles with respect to the axle 16. Thus, the wheels 19 can turn about the vertical axis of the fifth wheel tube 170 and also about the vertical axes of the hinge connections between the axle 16 and knuckles 18.

A tongue 20 connected to the axle 16 projects forwardly for pulling the machine from a tractor, or by means of draft animals, and the connection, as shown, includes hounds 21 secured at their forward ends to the tongue 20 and diverging rearwardly and having their rear ends hingedly connected, as at 22, to the axle 16 near the ends of said axle, whereby the tongue 20 can swing upwardly and downwardly. The rear end of the tongue 20 is secured to a cross bar 21' having its ends secured to the hounds 21. Thus, the axle 16 will swing in a horizontal plane with the tongue 20 in the manner of a buggy or wagon front axle.

Means is also provided for controlling the wheels 19 whereby to position them at different angles with respect to the axle 16, for steering the machine under the control of the operator. Thus, the knuckles 18 have arms 23 connected by links 24 with an arm 25 secured to the lower end of a shaft 17 which extends through the tube 170 and in being turned will swing the knuckles 18. As shown, the arms 23 project rearwardly from the axle while the other arm 25 projects forwardly, so that the links 24 are located obliquely across the axle 16, for the proper control of the steering wheels. In Fig. 3, the axle 16 is shown in transverse position in full lines, and in an oblique position in dotted lines (as in Fig. 1). The lower ends of the tube 170 and shaft 17 terminate below the bar 160 above the axle.

The upper end of the shaft 17 is connected by bevel gears 26 with a longitudinal shaft 27 journaled in bearings 27' on the frame 11, and on the rear end of the shaft 27 is secured a hand wheel 29 under the control of the operator.

With the combination steering gear, the wheels 19 can be kept in longitudinal planes, as seen in Fig. 1, when the axle 16 is swung to different angles with respect to the frame, and when the tongue 20 is swung, in pulling the machine, the wheels 19, in moving with ends of the axle 16, change their angular position with respect to the frame to facilitate steering. Thus, when the tongue 20 is swung toward the left (looking forwardly) then the axle 16 being swung likewise will, owing to the connection of the arms 23 by the links 24 with the arm 25, compel the wheels 19 to move about the knuckle pivots in the same direction as the tongue 20, thereby steering the machine toward the left, and if the tongue 20 is turned toward the right, the wheels 19 are angled toward the right. Furthermore, when the wheels 19 are angled, either by the swinging movement of the tongue 20 and axle 16, or by the turning of the knuckles 18 under the manual control, the wheel at the outer side of the curve will be moved through a less angle than the "inside" wheel, whereby the wheels 19, in their various positions, will be substantially tangential with the circular lines which they should follow in making the turn, as well known in automobile practice. Thus, by having the arms 23 at one side of the axle 16 and the arm 25 at the opposite side, the wheels 19 are properly angled by the swinging movement of either or both the axle 16 and the knuckles 18, thereby obtaining an operative combination between the centrally pivoted axle 16 and the knuckles 18 on the ends of the axle.

The tractor or draft medium, with the present arrangement, can be located at different positions transversely of the line of movement of the machine, either directly forwardly on the longitudinal line of travel, or at the right or left. In this manner, the tractor or draft medium can be located at one side, so as to travel in a line parallel with the machine, out of the path of the machine. The tractor can thus travel on the surface which is already graded, whereas the machine can travel on the ungraded portion of the road, and even though the tongue 20 is disposed obliquely, in pulling the machine forwardly, the wheels 19 can be set longitudinally or otherwise to resist side draft and to keep the machine in the desired line of travel under the control of the operator. A coupling member 34 is mounted on the tube 170 between the bolster 15 and block 151 to turn about said tube 170 and shaft 17. In pulling the machine from a tractor, a draft cable 35 is hitched to the tractor and extends rearwardly along the tongue 20 and the rear end is connected to the forward end of the coupling member 34 whereby the pull on said cable will be transmitted by the coupling member to the frame 31, thus relieving the frame 11 of the major part of the strain. The tongue 21 carries a guide member 36 through which the cable 35 extends whereby the tongue will swing laterally with the cable for turning said tongue and axle 16 accordingly.

Having thus described the invention, what is claimed as new is:—

A vehicle comprising a frame, a front axle, a vertical shaft, said frame, axle and shaft being connected for relative turning movement about the axis of said shaft, steering knuckles pivotally connected to the ends of said axle, arms carried by said knuckles and shaft, the arm of the shaft and knuckle arms extending forwardly and rearwardly in opposite directions, links connecting the knuckle arms with the arm of the shaft and extending obliquely across the axle, draft means for pulling the frame including a forwardly extending member connected to the axle for turning said axle about said axis, and a manually operable member carried bodily by the frame and operatively connected to said shaft and adapted to be moved or held against movement by an operator supported by the frame in the different angular positions of the axle and during the turning movement of the axle.

In testimony whereof I have signed my name to this specification in the presence of two subscribing witnesses.

CHARLES H. JONES.

Witnesses:
A. E. ANDERSON,
L. GRAINE.